United States Patent [19]

Maekawa et al.

[11] Patent Number: 4,859,754

[45] Date of Patent: Aug. 22, 1989

[54] WATER AND OIL REPELLANT HAVING DESOILING PROPERTIES

[75] Inventors: Takashige Maekawa; Kazuya Oharu, both of Yokohama; Tomoko Sakaguchi, Fukuoka, all of Japan

[73] Assignee: Asahi Glass Company, Ltd., Tokyo, Japan

[21] Appl. No.: 260,261

[22] Filed: Oct. 20, 1988

[30] Foreign Application Priority Data

Oct. 20, 1987 [JP] Japan ................................ 62-262752

[51] Int. Cl.$^4$ ............................................ C08F 18/20
[52] U.S. Cl. ................................... 526/245; 526/243
[58] Field of Search ................................. 526/245, 243

[56] References Cited

U.S. PATENT DOCUMENTS

| | | | |
|---|---|---|---|
| 3,654,244 | 4/1972 | Pittman et al. | 526/288 |
| 3,920,614 | 11/1975 | Kirimoto et al. | 526/246 |
| 4,170,585 | 10/1979 | Motegi et al. | 526/245 |
| 4,566,981 | 1/1986 | Howells | 526/245 |

FOREIGN PATENT DOCUMENTS 53-134786 11/1978 Japan.
53-134787 11/1978 Japan.
170801 7/1986 Japan.

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

A water and oil repellant having desoiling properties composed of a polyfluorinated group-containing copolymer obtained by copolymerizing the following monomers a and b as essential constituting components:

a: a polyfluorinated group-containing monomer
b: an amphipathic monomer having a hydrophilic moiety and a lipophilic moiety.

6 Claims, No Drawings

WATER AND OIL REPELLANT HAVING DESOILING PROPERTIES

The present invention relates to a high performance water and oil repellant which is capable of providing excellent desoiling properties, while maintaining high water repellency.

Heretofore, water and oil repellants composed of polymers or copolymers of a polyfluorinated group-containing monomer such as a perfluoroalkyl acrylate have been widely known. For example, Japanese Unexamined Patent Publication Nos. 75472/1974, 20991/1975, 134786/1978 and 134787/1978 and U.S. Pat. Nos. 3,654,244 and 3,920,614 propose water and oil repellants composed of copolymers obtained by copolymerizing a hydrophilic group-containing monomer to a polyfluorinated group-containing monomer for the purpose of imparting desoiling properties whereby deposited stains can readily be removed e.g. by washing (generally called desoiling or soil-removing properties or SR properties).

The above-mentioned conventional SR type water and oil repellants are usually inadequate in the water repellency and at the same time have the following difficulties with respect to the SR properties. Namely, a deterioration is observed in the effect for providing water repellency after the washing treatment, and the desoiling properties after exposed to a severe condition tend to be inadequate, thus leading to practical difficulties. For example, with conventional SR type water and oil repellants, the SR properties are inadequate against stains adhered during the wearing for a relatively long period of time, or against stains left adhered for a long period of time since their deposition until the washing operation, although they are capable of exhibiting adequate SR properties against a low level of stains.

In order to solve such a problem, the present applicant has previously proposed in a patent application a water and oil repellant composed of a copolymer obtained by copolymerizing a high Tg methacrylate monomer at a specific copolymerization ratio as a third component to a polyfluorinated group-containing monomer/a hydrophilic group-containing monomer. (See Japanese Patent Application No. 170801/1986.)

From a further research, the present inventors have found the following problem with the above-mentioned copolymerization system of a polyfluorinated group-containing monomer/a hydrophilic group-containing monomer. Namely, with the above-mentioned copolymerization system, although high performance may be obtained by solution polymerization, it is difficult to smoothly conduct the copolymerization reaction of the polyfluorinated group-containing monomer and the hydrophilic group-containing monomer by copolymerization in an aqueous dispersion system such as by emulsion polymerization. Accordingly, it used to be difficult to attain high levels of water and oil repellency and SR properties.

It is an object of the present invention to overcome both of the above-mentioned problems inherent to conventional SR type water and oil repellants and to provide a SR type water and oil repellant which is capable of providing adequate SR properties against heavy stains and which has high water repellency.

As a result of various researches and studies with the above object, the present inventors have made the following very interesting discoveries. Namely, it has been found possible to smoothly and advantageously conduct the copolymerization reaction not only by solution polymerization but also by polymerization in an aqueous dispersion system such as by emulsion polymerization, by employing an amphipathic monomer having not only a hydrophilic moiety but also a lipophilic moiety in the molecule, as a monomer to be copolymerized with the polyfluorinated group-containing monomer. Further, it has been found that by employing such an amphipathic monomer, excellent SR properties can be obtained while maintaining the water and oil repellency, and even by the polymerization in an aqueous dispersion system, it is possible to obtain both the water and oil repellency and the SR properties, which used to be difficult to attain simultaneously.

The present invention has been accomplished on the basis of the above-mentioned discoveries and provides a water and oil repellant having desoiling properties composed of a polyfluorinated group-containing copolymer obtained by copolymerizing the following monomers a and b as essential constituting components:
 a: a polyfluorinated group-containing monomer
 b: an amphipathic monomer having a hydrophilic moiety and a lipophilic moiety.

Now, the present invention will be described in detail with reference to the preferred embodiments.

In the novel water and oil repellant of the present invention, it is preferred that the weight ratio of a/b in the polyfluorinated group-containing copolymer is 65–95/5–35, and the total content of a and b in the copolymer is at least 80% by weight.

In the present invention, the polyfluorinated group-containing monomer may be an acrylate or methacrylate containing a terminal perfluoroalkyl group having from 3 to 20 carbon atoms, preferably from 6 to 14 carbon atoms, such as

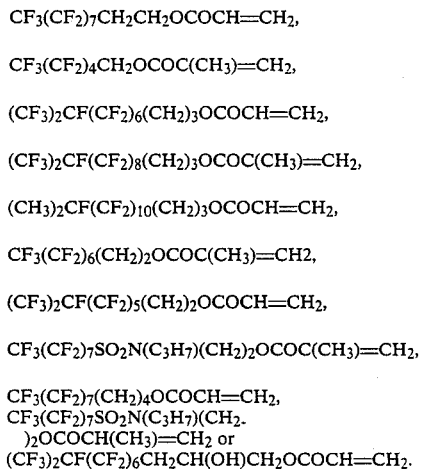

$CF_3(CF_2)_7CH_2CH_2OCOCH=CH_2$, $CF_3(CF_2)_4CH_2OCOC(CH_3)=CH_2$, $(CF_3)_2CF(CF_2)_6(CH_2)_3OCOCH=CH_2$, $(CF_3)_2CF(CF_2)_8(CH_2)_3OCOC(CH_3)=CH_2$, $(CH_3)_2CF(CF_2)_{10}(CH_2)_3OCOCH=CH_2$, $CF_3(CF_2)_6(CH_2)_2OCOC(CH_3)=CH_2$, $(CF_3)_2CF(CF_2)_5(CH_2)_2OCOCH=CH_2$, $CF_3(CF_2)_7SO_2N(C_3H_7)(CH_2)_2OCOC(CH_3)=CH_2$, $CF_3(CF_2)_7(CH_2)_4OCOCH=CH_2$,
$CF_3(CF_2)_7SO_2N(C_3H_7)(CH_2)_2OCOCH(CH_3)=CH_2$ or
$(CF_3)_2CF(CF_2)_6CH_2CH(OH)CH_2OCOCH=CH_2$.

A fluoroalkyl group-containing polymerizable compound such as $H(CF_2)_{10}CH_2OCOCH=CH_2$ or $CF_2Cl(CF_2)_{10}OCOCH=CH_2$ may also be mentioned. However, the above-mentioned monomer having a terminal perfluoroalkyl group is preferred from the viewpoint of the water and oil repellency.

In the present invention, the amphipatic monomer having a hydrophilic moiety and a lipophilic moiety is the one having, as the hydrophilic moiety, a non-ionic group such as a polyoxyethylene chain, an anionic group such as a sulfonic acid group or a carboxylic acid group, or a cationic group such as an ammonium salt or an amine salt, and, as the lipophilic moiety, a polyoxypropylene chain, a polyoxybutylene chain or an alkylene chain. Usually, an amphipathic monomer having a hydrophilic-lipophilic balance (HLB) of hydrophilic moiety/lipophilic moiety being from 5 to 15 is selected. In the present invention, it is particularly preferred to employ a mixed polyoxyalkylene chain-containing amphiphatic monomer which has, as the hydrophilic moiety, a polyoxyethylene chain and, as the lipophilic moiety, a polyoxypropylene chain capable of controlling the crystallinity of the polyoxyethylene chain. Namely, such a mixed polyoxyalkylene chain-containing amphipathic monomer is advantageous from the viewpoint of the reactivity for the copolymerization with the polyfluorinated group-containing monomer and the availability. It is also excellent in providing high performance of the SR properties and the water and oil repellency simultaneously. Particularly preferred as such an amphipathic monomer is an acrylate or methacrylate of the formula:

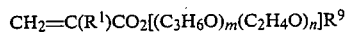

wherein $R^1$ is H or $CH_3$, $R^2$ is H or a $C_1$–$C_{20}$ alkyl or aralkyl group, $m \geq 1$, $n \geq 1$, and $60 \geq m+n \geq 2$.

In the present invention, the amphiphatic acrylate or methacrylate having the above formula is preferably selected from those having a polyoxyalkylene chain moiety with HLB of from 5 to 15. It is usual to employ the one wherein $m+n=5$ to 30, and $m/n = \frac{1}{4}$ to 4/1, preferably $\frac{1}{2}$ to 2/1. $R^1$ may be H or $CH_3$, but $R^2$ is preferably a $C_1$–$C_{20}$ alkyl group rather than H. For example, $R^2$ is preferably a methyl group or a $C_2$–$C_{18}$ alkyl group.

In the specified copolymer of the present invention, the weight ratio of the polyfluorinated group-containing monomer (component a)/the specified amphipathic monomer component b) is usually from 65–95/5–35, preferably 70–90/10–30, and the total content of components a and b in the copolyer is usually at least 80% by weight, preferably at least 85% by weight.

In the present invention, in addition to the above-mentioned essential components a and b, one or more additional monomers such as a monomer having a cross-linking group or an adsorption group to fibers, a high Tg monomer for improving the film-forming property, or a low Tg monomer for improving the flexibility of the coating film, may be incorporated without any particular restriction.

To obtain the copolymer of the present invention, various systems and conditions for the polymerization reaction may be employed, and any of various polymerization systems such as bulk polymerization, solution polymerization, suspension polymerization, emulsion polymerization, radiation polymerization and photo polymerization may be employed. As the polymerization initiating source, various polymerization initiators such as an organic peroxide, an azo compound and a persulfate as well as ionized radiation such as γ-rays, may be employed. As an emulsifier for emulsion polymerization, almost all emulsifiers including anionic, cationic and non-ionic emulsifiers may be used. Thus, it is possible that the polymerizable compound as the starting material is dissolved in an organic solvent and polymerized by solution polymerization by the action of a polymerization initiating source (such as a peroxide or azo compound soluble in the organic solvent used, or ionized radiation). The solvent suitable for the solution polymerization includes trichlorotrifluoroethane, tetrafluorodifluoroethane, methylchloroform, ethanol, isopropanol and a solvent mixture thereof.

With respect to the composition of the organic solution thus obtained, there is no particular restriction as to the concentration of the specified copolymer in the organic solvent. Usually, however, satisfactory properties can be imparted in the treatment of fiber fabrics if the concentration is at least about 0.05% by weight. Further, it is possible to prepare the composition in the form of a concentrated solution having a concentration of from 4 to 50% by weight, preferably from 6 to 35% by weight, so that it will be diluted for use to a concentration of from 0.05 to 4% by weight, preferably from 0.3 to 1.5% by weight. Thus, the concentration of the specified copolymer can be adjusted within a wide range of from 0.05 to 50% by weight, preferably from 0.3 to 35% by weight. If the concentration is too low, the effect for imparting the desired properties will be inadequate, and if the concentration is too high, it will be difficult to obtain a uniform solution.

Further, in the present invention, it is possible that the organic solution is prepared as described above, then a propellant such as dichlorofluoromethane, monofluorotrichlorom-ethane, dichlorotetrafluoroethane, propane, butane, vinyl chloride, dimethyl ether, $CO_2$ or $N_2O$ is added thereto, and the mixture is filled in a container to obtain an aerosol.

The feature of the present invention is significant particularly in the polymerization in an aqueous dispersion system. Namely, the copolymerization system of the present invention may be a solution polymerization system as described above in which a high performance can of course be obtained. However, according to the present invention, the water and oil repellency and the SR properties can be attained simultaneously even in the aqueous dispersion system, in which the conventional SR type water and oil repellant can hardly attain the desired properties. It presents a significant advantage in the industrial operation that high performance can be obtained by an aqueous dispersion system. For example, with such a system, the flash point is high as compared with the organic solvent system, or no flash point exists, the composition of the treating bath can easily be controlled, and no adverse effects will be imparted to the articles to be treated. Usually, the water and oil repellant of the present invention may be prepared in the form of a concentrated aqueous dispersion having a solid concentration of from 5 to 50% by weight, preferably from 15 to 30% by weight, so that it may be diluted at the time of treatment to a concentration of from 0.1 to 5.0% by weight., preferably from 0.3 to 2.0% by weight.

The water and oil repellant of the present invention may be applied to the articles to be treated by an optional method depending upon the type of the articles to be treated or the above-mentioned preparation system (e.g. the aqueous dispersion, the solution or the aerosol). For example, in the case of the solution system, it is possible to employ a method wherein the repellant is deposited on the surface of the articles to be treated by a known coating method such as a dip coating method, followed by drying. If necessary, the repellant is applied together with a suitable cross-linking agent, followed by curing. In the case of the aerosol system, the repellant can simply be sprayed to the articles to be treated, whereupon it is immediately dried to provide adequate properties. In the case of the aqueous dispersion system particularly suitable in the present invention, the articles to be treated are dipped in a treating bath prepared to have the above-mentioned solid concentration, then squeezed to a suitable extent so that the latex is deposited on the surface, followed by drying and curing. Also in this case, a cross-linking agent may be incorporated, if necessary.

Further, to the polyfluorinated group-containing specified copolymer, other polymer blenders may be incorporated. Further, other water repellants or oil repellants, or optional additives such as insecticides, flame retardants, antistatic agents, dyestuffs, stabilizers or crease preventing agents, may be incorporated, as the case requires.

The articles to be treated by the water and oil repellant of the present invention are not restricted to fiber fabrics, and various examples may be mentioned, including glass, paper, wood, leather, fur, asbestos, bricks, cement, metals and their oxide, porcelains, plastics, coated surfaces and plasters. As the fibrous fabrics, fabrics made of animal or plant natural fibers such as cotton, wool or silk; various synthetic fibers such as polyamide, polyester, polyvinyl alcohol, polyacrylonitrile, polyvinyl chloride or polypropylene; semisynthetic fibers such as rayon or acetate; inorganic fibers such as glass fiber or asbestos fiber; or blends of these fibers, may be mentioned.

In the present invention, the water and oil repellant is believed to provide high water repellency under a normal condition since the polyfluorinated groups such as perfluoroalkyl groups cover the surface of the cloth. At the time of washing, however, the hydrophilic moiety contained in the copolymer appears on the surface of the cloth to provide wettability to a soap solution and thereby to improve the desoiling properties. This is believed to be the reason why the water repellency and desoiling properties can be obtained simultaneously. Further, the amphiphatic monomer exhibits a suitable lipophilic prpperties during the polymerization, especially during the polymerization in an aqueous dispersion system (such as suspension polymerization or emulsion polymerization), whereby the distribution to the aqueous phase is controlled, and the compatibility with the polyfluorinated group-containing monomer is improved. Consequently, the random copolymerization proceeds smoothly, and the water and oil repellency and the desoiling properties are believed to be thus obtainable simultaneously and advantageously.

However, it should be understood that the above explanation is intended solely to help understand the present invention and by no means restricts the present invention.

Now, the present invention will be described in further detail with reference to Examples. However, it should be understood that the present inventioniis by no means restricted by these specific Examples.

In the following Examples, the water repellency and the oil repellency are represented by the following standards.

Namely, the water repellency is represented by the water repellency number (see the following Table 1) by the spray method of JIS L-1005. The oil repellency was determined by placing a few drops (a diameter of about 4 mm) of the test solution as shown in the following Table 2, on a sample cloth at two locations, and evaluating the infiltration condition upon expiration of 30 seconds. (AATCC-TM 118-1966).

TABLE 1

| Water repellency No. | State |
|---|---|
| 100 | No wetting was observed on the surface. |
| 90 | The surface was slightly wetted. |
| 80 | The surface was partly soaked. |
| 70 | The surface was soaked. |
| 50 | The entire surface was soaked. |
| 0 | The entire cloth was completely soaked. |

TABLE 2

| Oil repellency | Test solution | Surface tension dyne/cm, 25° C. |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Hexadecane 35/Nujol 65 mixed solution | 29.6 |
| 1 | Nujol | 31.2 |
| 0 | Poorer than 1 | — |

The tests for desoiling properties (SR properties) were conducted as follows. A sample cloth was placed on a blotting paper spread horizontally, five drops of heavy oil-B were dropped thereon, a polyethylene sheet was placed thereon, and a weight of 2 kg was loaded thereon. 60 minutes later, the weight and polyethylene sheet were removed, the excess oil was wiped off, and the sample cloth was left to stand at room temperature for one hour. Then, the sample cloth and ballast cloth were charged into an electric washing machine with a capacity of 35 liters in a total amount of 1 kg, washed at 40° C. for 10 minutes by using 60 g of a detergent (Super Zab, trade name), rinsed and dried in air. The stained level of the sample cloth was compared with the photographic standards of AATCC Test Method 130-1970 and the desoiling properties of the sample cloth were represented by the corresponding standard level.

TABLE 3

| Desoiling levels | Evaluation standards |
|---|---|
| 1 | Remarkable stains were observed. |
| 2 | Substantial stains were observed. |
| 3 | Slight stains were observed. |
| 4 | No substantial stains were observed. |
| 5 | No stain was observed. |

The water repellency number, the oil repellency and the SR properties marked with symbol + indicate that the respective properties are slightly better.

EXAMPLE 1

Into a glass ampoule having an internal capacity of 100 ml, 8.0 g of $CH_2=CHCOOC_2H_4C_xF_{2x+1}$ wherein x is from 6 to 16 and an average of 9 (hereinafter referred to simply as FA), 2.0 g of

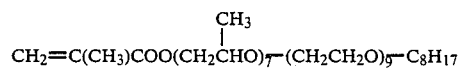

(hereinafter referred to simply as POEP), 20 g of trichlorotrifluoroethane 0.2 g of azobisisobutyronitrile and 0.05 g of-t-dodecylmercaptan were charged. The gas phase of the ampoule was replaced by nitrogen, and the ampoule was closed, heated and shaked at 60° C. for 12 hours for copolymerization. The copolymer solution thus obtained was diluted with trichlorotrifluoroethane to obtain a solution having a solid content of 0.6% by weight. To this diluted solution, a polyester cloth was dipped, then dried in air and subjected to heat treatment at 150° C. for 3 minutes. The water repellency (WR), the oil repellency (OR) and the SR properties of the treated cloth were measured. The results are shown in Table 4.

COMPARATIVE EXAMPLE 1

In the same manner as in Example 1, the copolymerization, the preparation of the solution, the treatment and the measurement of the properties were conducted except that instead of POEP in Example 1, $CH_2=C(CH_3)COO(C_2H_4O)_7-CH_3$ (hereinafter referred to simply as M90G) was used. The results are shown in Table 4.

EXAMPLE 2 and COMPARATIVE EXAMPLE 2

In the same manner as in Example 1, the copolymerization, the preparation of a solution, the treatment and the measurement of the properties were conducted except that the monomer as identified in Table 4 was used. The results are shown in Table 4.

TABLE 4

| | Copolymer composition (wt %) | Initial OR/WR | SR | After washing 5 times OR/WR | SR |
|---|---|---|---|---|---|
| Example 1 | FA/POEP=80/20 | 6/100 | 4 | 6/70+ | 3 |
| Example 2 | FA/PMEP=80/20 | 6/100 | 4 | 6/70+ | 3 |
| Comparative Example 1 | FA/M90G=80/20 | 6/70 | 4 | 5/50+ | 3 |
| Comparative Example 2 | FA/PE350=80/20 | 6/60 | 2 | 5/50+ | 1 |

Note:
The SR properties were measured after the sample was left to stand for one hour.

In Table 4, PMEP represents $$CH_2=C(CH_3)COO(CH_2CHO)_7-(C_2H_4O)_9-CH_3, \text{ and}$$
$$\overset{|}{CH_3}$$

PE350 represents $CH_2=C(CH_3)COO(C_2H_4O)_9-H$.

EXAMPLE 3

A monomer/emulsifier/water mixture comprising 32.0 g of FA, 10.0 g of POEP, 1.5 g of polyoxyethyleneoleyl ether, 0.25 g of trimethylstearylammonium chloride, 10.0 g of ethyl acetate and 121.3 g of deionized water, was emulsified by a high pressure homogenizer. Then, 50 g of the emulsion thus obtained, 0.24 g of azobisisobutyronitrile and 0.12 g of tert-dodecylmercaptan were charged into a 100 ml glass ampoule. The gas phase was replaced by nitrogen, and the mixture was copolymerized at 60° C. for 12 hours. The emulsion thereby obtained was diluted with deionized water to obtain a treating bath having a solid content of 1.0% by weight. A polyester cloth was dipped therein, then squeezed by an angle to a pick up of 70% and then dried by hot air at 130° C. for 3 minutes and cured at 170° C. for one minute. The WR, OR and SR properties of the treated cloth are shown in Table 5.

EXAMPLES 4 to 7 and COMPARATIVE EXAMPLES 3 to 4

The copolymerization, the preparation of a treating bath and the treatment were conducted in the same manner as in Example 3 except that the monomer composition in Example 3 was changed to the monomers and the amounts as identified in Table 5. The results are shown in Table 5.

TABLE 5

| | Copolymer composition (wt %) | Initial OR/WR | SR | After washing 5 times OR/WR | SR |
|---|---|---|---|---|---|
| Example 3 | FA/POEP=80/20 | 6/90 | 4 | 5/70 | 3 |
| Example 4 | FA/PMEP=80/20 | 6/90 | 4 | 5/70 | 3 |
| Example 5 | FA/POEP/PP800 = 70/20/10 | 6/90 | 4 | 5/80 | 3-4 |
| Example 6 | FA/PCPE/PP800 = 70/20/10 | 7−/90+ | 4-3 | 5/80 | 3 |
| Example 7 | FA/PMEP/PP800 = 70/20/10 | 6/90 | 4 | 5/80 | 3-4 |
| Comparative Example 1 | FA/M90G=80/20 | 6/70 | 3 | 5/50 | 2 |
| Comparative Example 2 | FA/M90G/PP800 = 70/20/10 | 6/70 | 3 | 5/60− | 2 |

Note:
The SR properties were measured after the sample was left to stand for one hour.

In Table 5, PP800 represents $$CH_2=C(CH_3)COO(CH_2CHO)_{13}H, \text{ and PCPE represents}$$
$$\overset{|}{CH_3}$$

$$(CH_2=C(CH_3)COO(CH_2CH_2O)_{10}(CH_2CHO)_4-C_{16}H_{33}-n.$$
$$\overset{|}{CH_3}$$

The water and oil repellant of the present invention has an excellent effect of providing the water and oil repellency and the desoiling properties simultaneously, and it also exhibits an effect such that after the washing operation, a high level of water and oil repellency can be obtained without heat treatment. Particularly, it provides remarkable effect such that a high level of both properties can be obtained in an aqueous dispersion system.

We claim:
1. A water and oil repellant having desoiling properties composed of a polyfluorinated group-containing copolymer obtained by copolymerizing the following monomers a and b as essential constituting components:
   a: a polyfluorinated group-containing monomer
   b: an amphipathic monomer having a hydrophilic moiety and a lipophilic moiety.
2. The water and oil repellant according to claim 1, wherein the weight ratio of a/b in the polyfluorinated group-containing copolymer. is 65-95/5-35, and the total content of a and b in the copolymer is at least 80% by weight.
3. The water and oil repellant according to claim 1, wherein the polyfluorinated group-containing monomer is a monomer containing a perfluoroalkyl group having from 3 to 20 carbon atoms.
4. The water and oil repellant according to claim 1, wherein the polyfluorinated group-containing monomer is an acrylate or methacrylate containing a perfluoroalkyl group having from 3 to 20 carbon atoms.

5. The water and oil repellant according to claim 1, wherein the amphipathic monomer is a monomer containing mixed polyoxyalkylene groups constituting the hydrophilic moiety and the lipophilic moiety.

6. The water and oil repellant according to claim 1, wherein the amphipathic monomer is an acrylate or methacrylate having the following formula:

$$CH_2=C(R^1)CO_2[(C_3H_6O)_m(C_2H_4O)_n]R^2$$

wherein $R^1$ is H or $CH_3$, $R^2$ is H or a $C_1$-$C_{20}$ alkyl or aralkyl group, $m \geq 1$, $n \geq 1$, and $60 \geq m+n \geq 2$.

* * * * *